United States Patent
Kidprasert (10) Patent No.: US 7,967,025 B2
(45) Date of Patent: Jun. 28, 2011

(54) OVERFILL PROTECTION DEVICE (OPD)

(75) Inventor: Jakaphan Kidprasert, Bangkok (TH)

(73) Assignee: SCG (Thailand) Co., Ltd., Patumtani (TH)

( * ) Notice: Subject to any disclaimer, the term of this patent is extended or adjusted under 35 U.S.C. 154(b) by 869 days.

(21) Appl. No.: 11/882,744

(22) Filed: Aug. 3, 2007

(65) Prior Publication Data

US 2009/0032748 A1    Feb. 5, 2009

(51) Int. Cl.
     *F16K 31/18*      (2006.01)

(52) U.S. Cl. ......... 137/410; 251/251; 137/434; 137/413

(58) Field of Classification Search .................. 251/251, 251/262, 263, 339; 137/410, 413, 434, 443; 73/309, 317
See application file for complete search history.

(56) References Cited

U.S. PATENT DOCUMENTS

| | | | | |
|---|---|---|---|---|
| 4,305,422 A | * | 12/1981 | Bannink | 137/415 |
| 4,444,230 A | * | 4/1984 | Van Mullem | 141/198 |
| 5,460,197 A | * | 10/1995 | Kerger et al. | 137/39 |
| 5,842,500 A | * | 12/1998 | Rockwood et al. | 137/413 |
| 6,138,709 A | * | 10/2000 | Home | 137/413 |
| 6,178,994 B1 | * | 1/2001 | Park | 137/413 |
| 6,293,302 B1 | * | 9/2001 | Waters et al. | 137/390 |
| 6,640,829 B1 | * | 11/2003 | Kerger | 137/413 |
| 6,910,499 B2 | * | 6/2005 | Chan | 137/413 |
| 7,040,343 B2 | * | 5/2006 | Tseng | 137/390 |
| 7,219,686 B2 | * | 5/2007 | Schmitz et al. | 137/413 |
| 7,487,793 B2 | * | 2/2009 | Schmitz et al. | 137/558 |
| 2004/0177884 A1 | * | 9/2004 | Konishi | 137/540 |
| 2006/0090795 A1 | * | 5/2006 | Chan | 137/446 |
| 2006/0169325 A1 | * | 8/2006 | Schmitz et al. | 137/413 |

* cited by examiner

*Primary Examiner* — John K Fristoe, Jr.
*Assistant Examiner* — Marina Tietjen
(74) *Attorney, Agent, or Firm* — Muncy, Geissler, Olds & Lowe, PLLC (57) ABSTRACT

An overfill protection device includes a piston (5) comprising a main seal or semi-sphere packing (3) on its tip and a V-shaped packing (4) on its side, a retracting spring (2) for pushing the piston back to its original position, a main valve (7) with an o-ring that drops into the inner hole of the retainer (10) to block off the gas flow, a level arm consisting of a rising faced section (28) and a U-shaped section (29), whereby no gas will be allowed to flow through the overfill protection device when the gas reaches the predetermined 80 percent level.

18 Claims, 10 Drawing Sheets

FIG 8
(VALVE & OPD ASSEMBLY)

HOUSING 1
(18) ULLAGE TUBE HOLDER
ULLAGE TUBE 39

OVERFILL PROTECTION DEVICE (OPD)

FIELD OF INVENTION

Mechanical engineering related to overfill protection device

BACKGROUND OF THE INVENTION

The present invention relates to an overfill protection device, more particularly to an overfill protection device used for a fluid container to prevent overfilling of the container or gas cylinder, with an ullage tube to determine the 80 percent level of the liquid filled in the container or gas cylinder.

DESCRIPTION OF THE PRIOR ART

Devices which use gas, such as liquefied petroleum gas (LPG), liquefied natural gas (LNG), compressed natural gas (CNG), etc., need to be refilled when a gas storage tank of the device is empty.

To prevent the explosion which possibly occurs due to the overfilling of gas when the gas is filled in the storage tank, it is required to provide a safety valve which, in the case of charging the gas with a certain level of a gas pressure, automatically operates by the gas pressure in the gas storage tank and is then operated to externally discharge the overfilled gas. At present, the gas industry is constantly faced with the negligence or carelessness in handling the gas tank and assemblies which results in many fire incidents and injuries as well as loss of life.

For a proper operation of the safety valve, the filling level of the liquefied gas to be filled in the gas storage tank has to be retained at a certain level so that a gaseous zone can be formed at the upper side.

SUMMARY OF THE INVENTION

Therefore, it is an objective of the present invention to solve the above-mentioned problems and to provide an overfill protection device which is safe to use and operate regardless of the person who handles it and how it is handled.

In general, the cylinder is filled at the station or the filling plant either by weight or by gas level. When it arrives at 80 percent of the liquid level, the operator has to stop the filling so that the cylinder will not be overfilled.

Generally, propane and butane which is in liquid phase will evaporate when the gas is heating up and the pressure rises. With the 20 percent space at the top of the cylinder, the liquid phase is allowed to expand to the vapor phase, so the cylinder is not in the threat of expanding too much until it explodes. As a result, the danger of the gas cylinder explosion due to the overfilling can be avoided. The OPD is activated at the designated level so that the overfilling is prohibited. Normally, the designated level is 80 percent in order to leave enough room at the top of the cylinder for the gas to expand. Without this device, the careless filler may overshoot the filling process, thus the tank will be overfilled. When this happens, the liquid gas is at its maximum level. There is no room for the liquid gas to expand. Once the cylinder is put under the sun or near the stove, the heat will cause the gas to expand. Without the 20 percent space at the top, the liquid will act as a hydraulic tool when it expands. The pressure that is exerted to the shell of the cylinder is enormous. If this pressure happens to be greater than the determined pressure of the cylinder, the breakage of the cylinder is unavoidable. However, if we have this OPD device, even if the operator forgets to shut off the pump or close the valve when the filling reaches the 80 percent level, it will prevent the overfilling from happening and the 20 percent space at the top of the cylinder can always be obtained. So if the cylinder is heating up, the chance of the cylinder to explode due to the gas expansion with 20 percent leverage at the top is not possible. Therefore, the safety of the cylinder can be enhanced.

BRIEF DESCRIPTION OF THE DRAWINGS

FIG. 3.1 and FIG. 3.2 illustrate the backward position of the piston and the spring of the invention;

FIG. 5.1 shows the main parts in the small chamber area in FIG. 4;

FIG. 5.2 shows the main parts during the filling of gas;

DETAILED DESCRIPTION OF THE INVENTION

Figure 1:
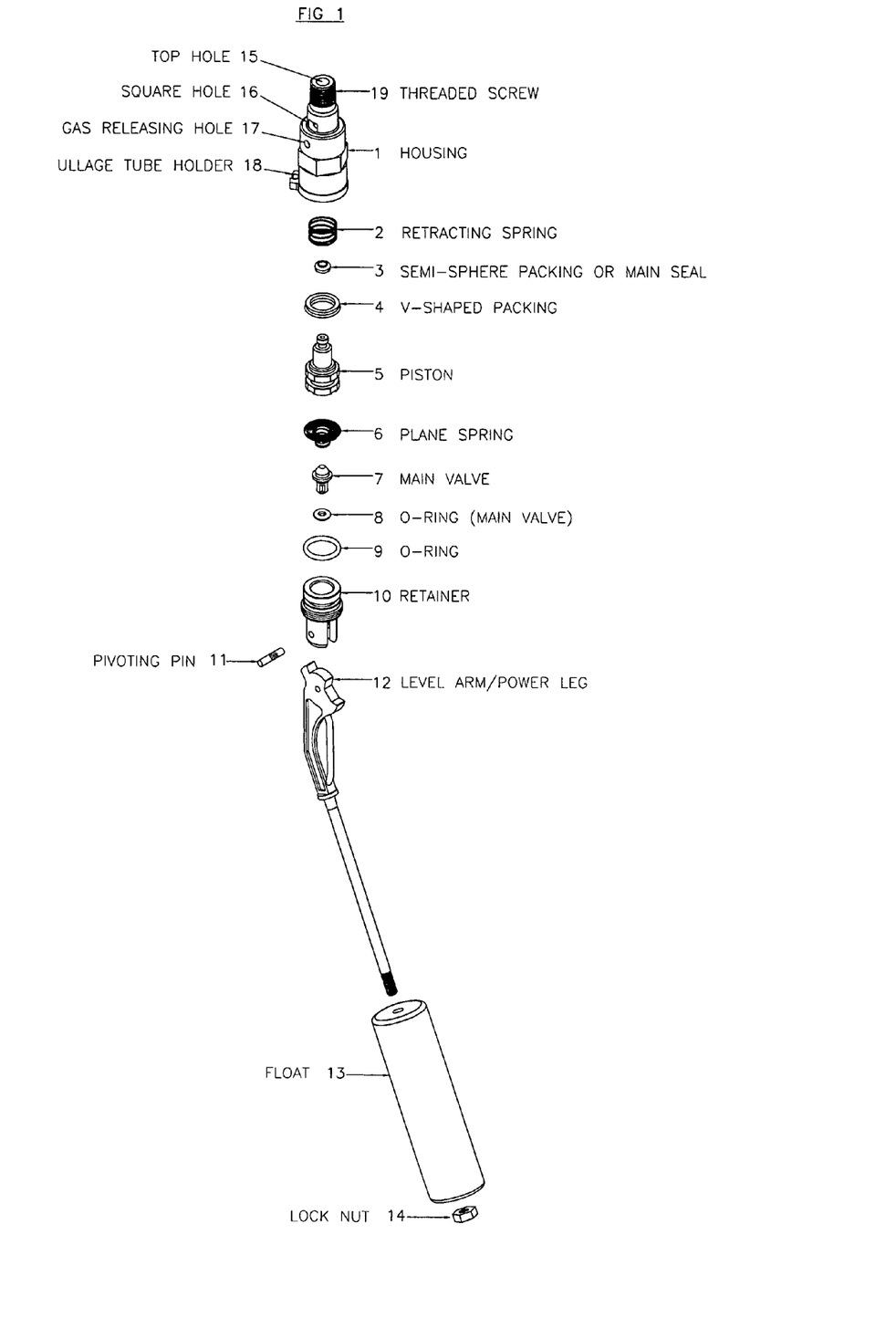
FIG. 1 and FIG. 2 are the exploded views of the components of the overfill protection device of the invention.
Figure 2:
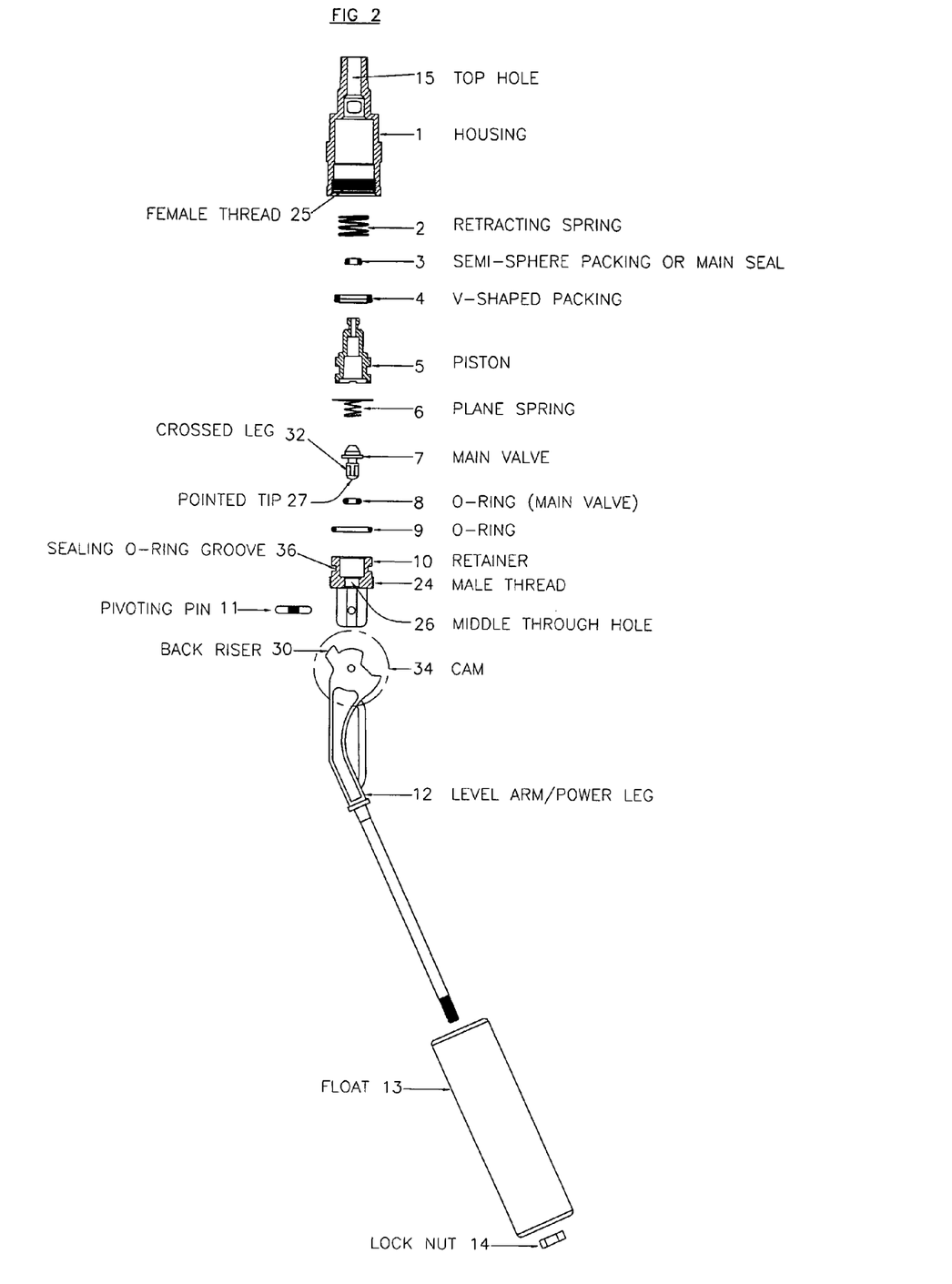
Figure 8:
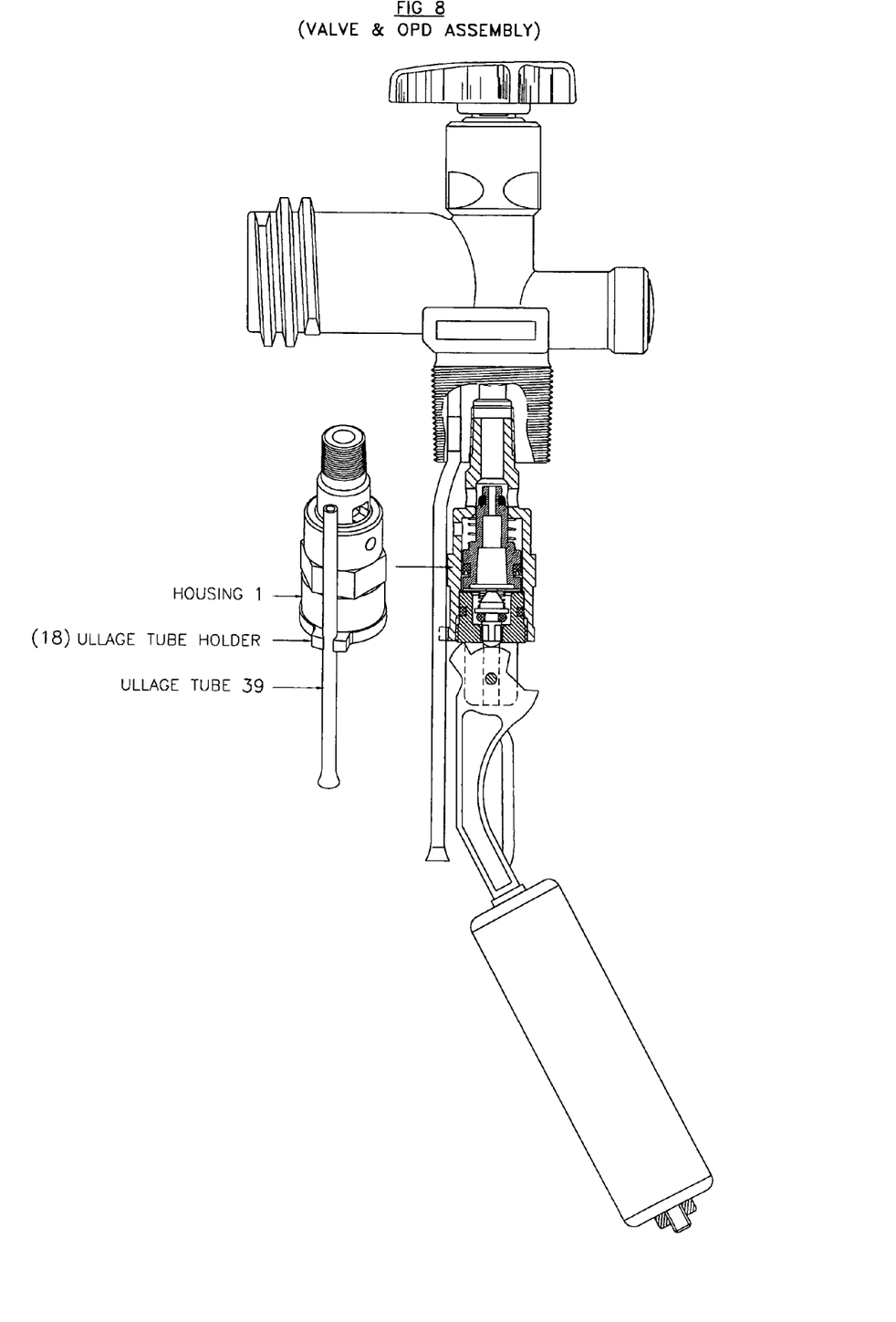
FIG. 8 shows the valve body of the invention.

The assembly of the "Overfill Protection Device" is as illustrated in the exploded drawings of FIG. 1 and FIG. 2. It contains the housing (1) which has 3 unique holes and a holder. The top hole (15) which is in the centre of the housing (1) has a circular shape. It allows gas to flow in and out of the device. On the outside of the housing (1), there is a threaded screw (19) which is to be screwed onto the valve body as can be seen in FIG. 8. The second hole is the square hole (16) which protrudes across the lower part of the circular hollow hole in the middle. This square hole (16) allows the gas to flow through from the center top hole (15) into the tank. The other hole is the gas releasing hole (17) which allows the extra gas to release into the tank so that the breakage of the housing does not occur in case there is excessive pressure acting inside the housing (1). The holder (18) is used to hold the ullage tube (39) which measures the 80 percent level of the liquid filled. This is also illustrated in FIG. 8 and FIG. 5.1.

Figure 4:
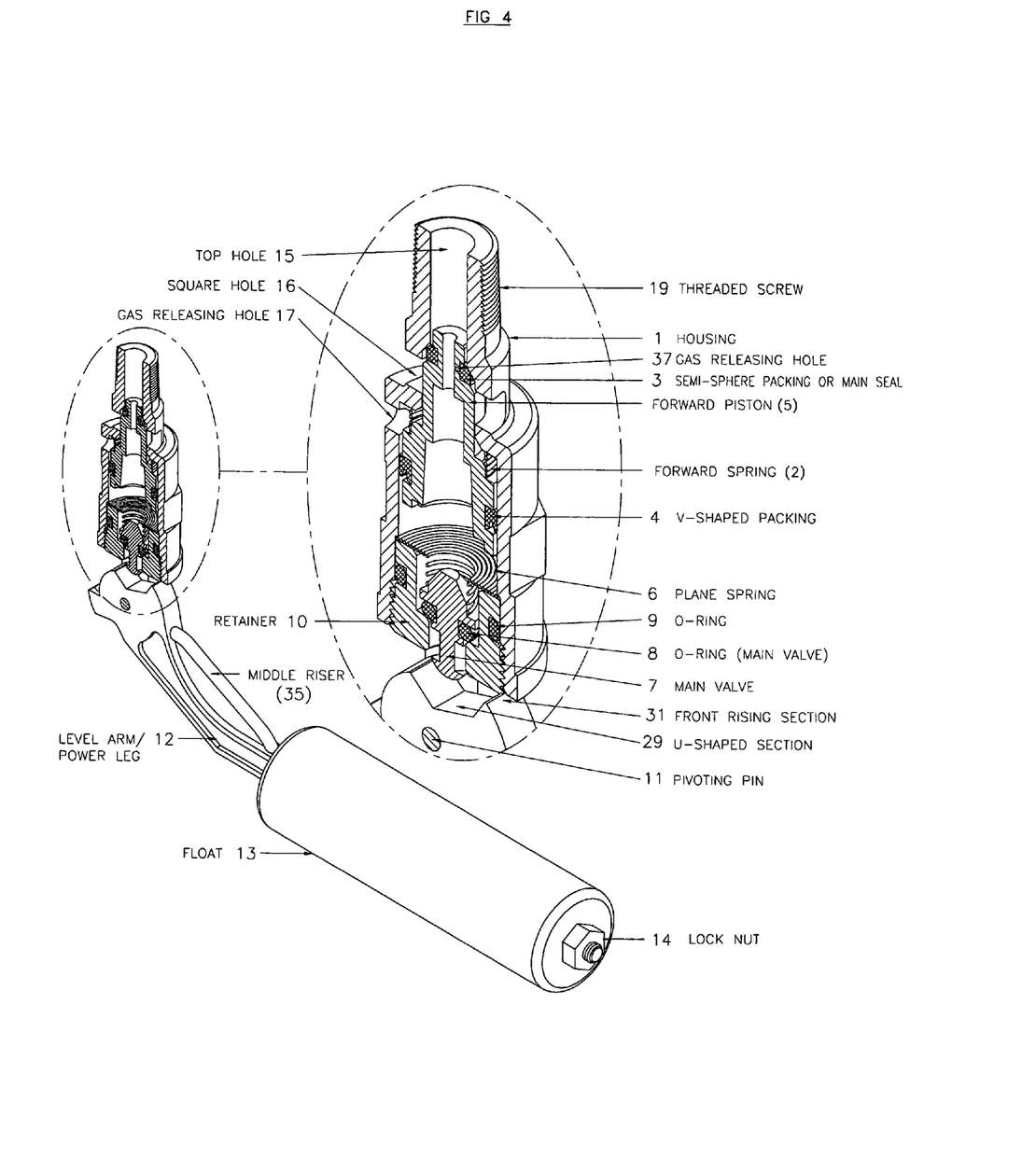
FIG. 4 illustrates the forward position of the piston and the spring of the invention.
Figure 31:
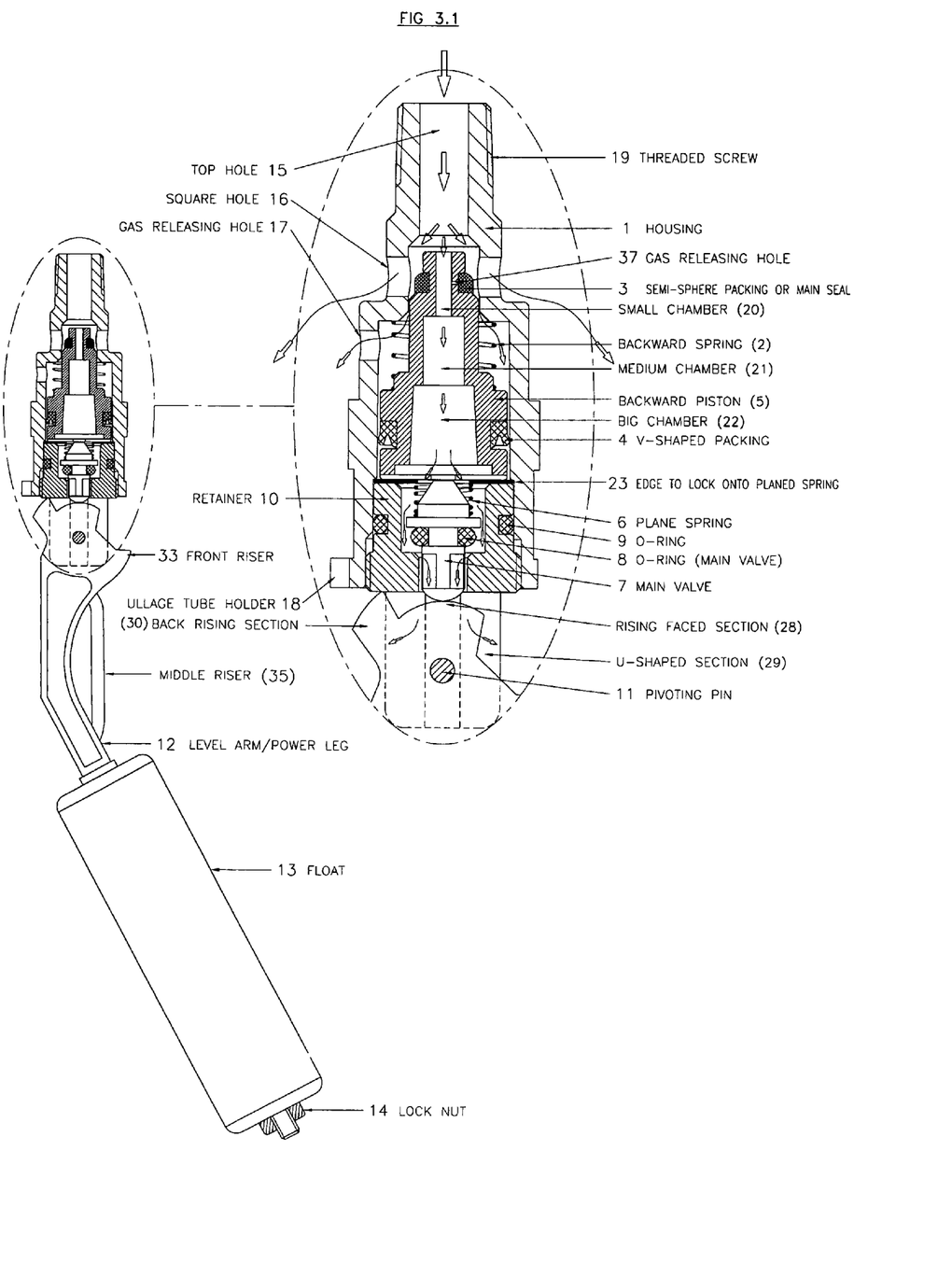
Figure 32:
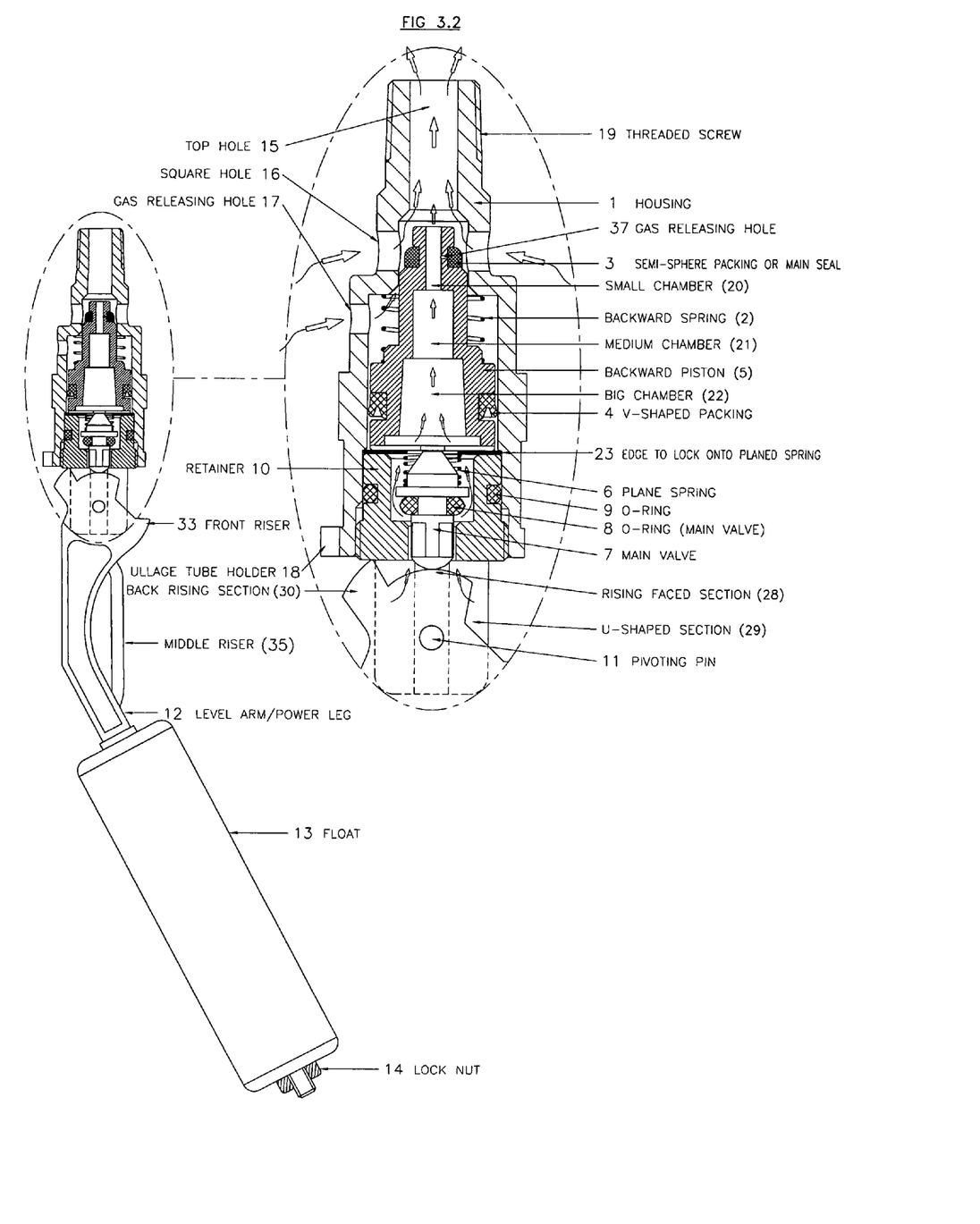

The spring (2) is the retracting spring which allows the piston (5) to be pushed back to its originally opened position after it has been activated to move forward. FIG. 3.1 & FIG. 3.2 illustrate the backward position and FIG. 4 illustrates the forward position of the piston and the spring.

Figure 51:
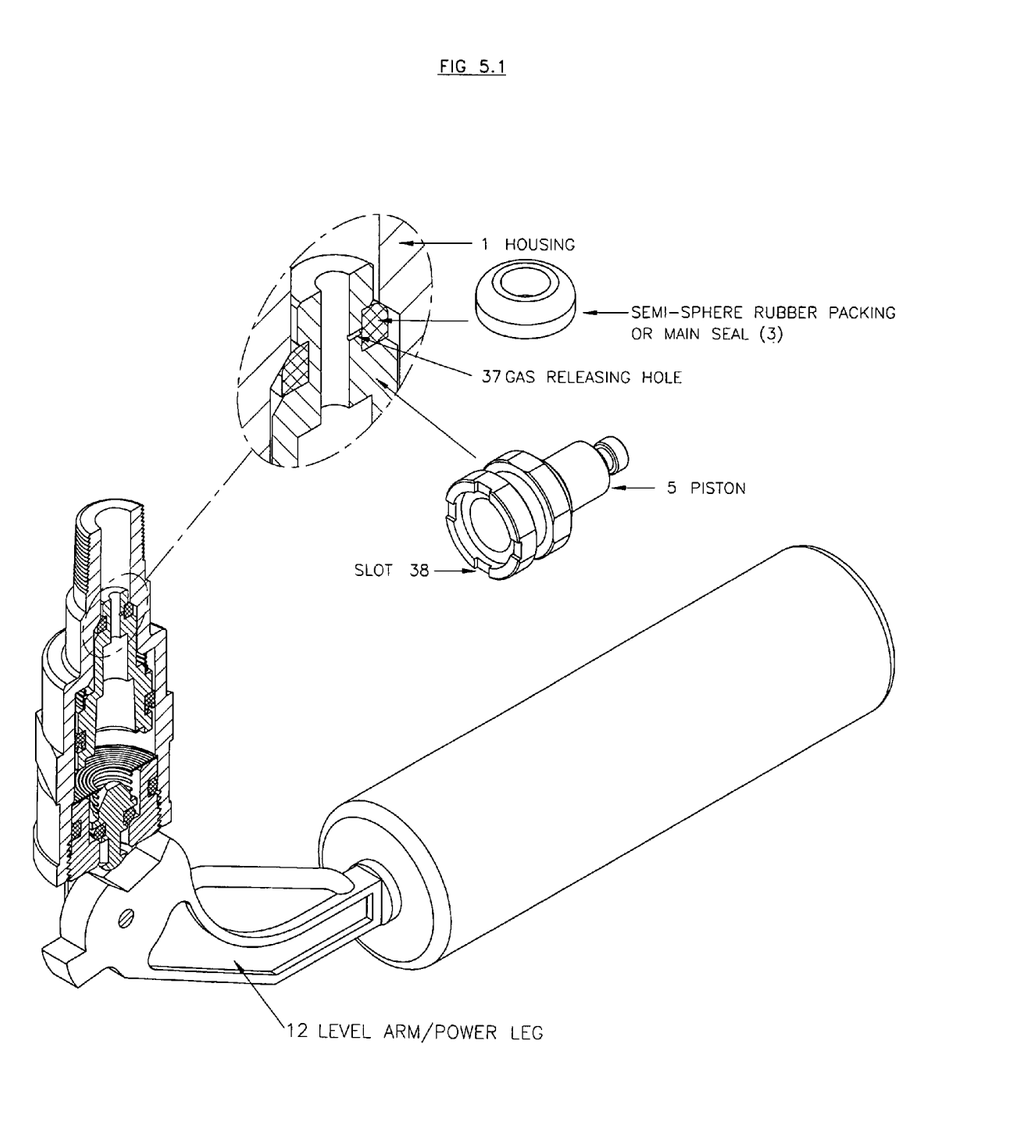
Figure 52:
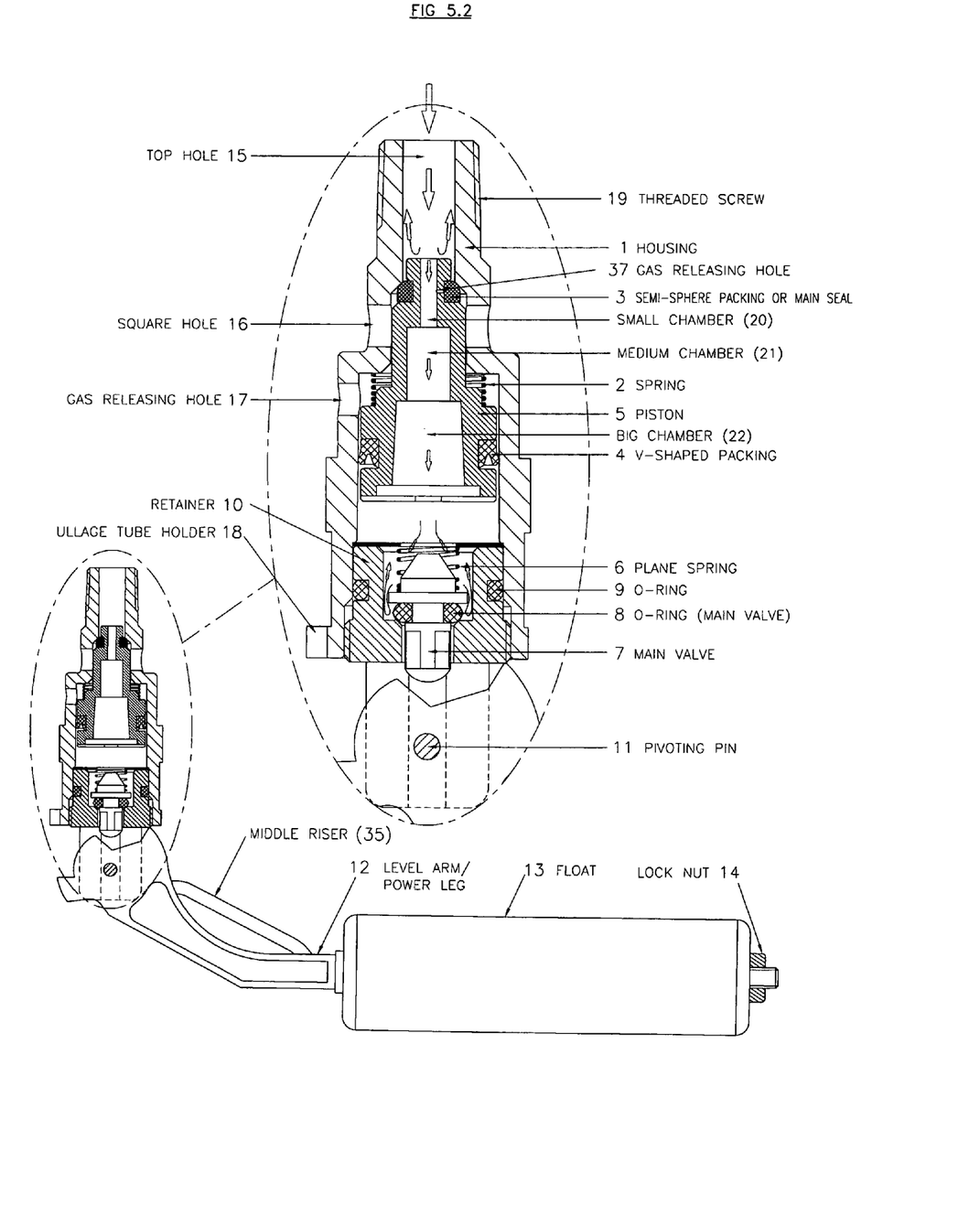

The piston (5) is the sliding bullet which can shoot upward and downward. It consists of a main seal or semi-sphere packing (3) on the tip and a "V-shaped packing" (4) on the side of the piston. Under the piston, there are four slots (38) with holes to allow the gas to flow up to the V-shaped packing (4). This will allow the pressure to build up under the piston and push the piston forward if the pressure is large enough. Under the main seal (3), there lies a releasing hole (37). This will allow the releasing of the excess pressure of the piston to flow back to the tank, so the OPD will not withstand too much pressure which causes it to fail to operate. This is as illustrated in FIG. 5.1. In the middle of the piston, there is a big chamber, divided into three cylindrical chambers: a small chamber (20), a medium chamber (21), and a big chamber (22) as illustrated in FIG. 3.1 and FIG. 3.2. The piston (5) is in a normally opened position. It is pushed backward by the retracting spring (2). It has the V-shaped packing (4) on the side and the semi-sphere packing or the main seal (3) in the forefront.

Figure 6:
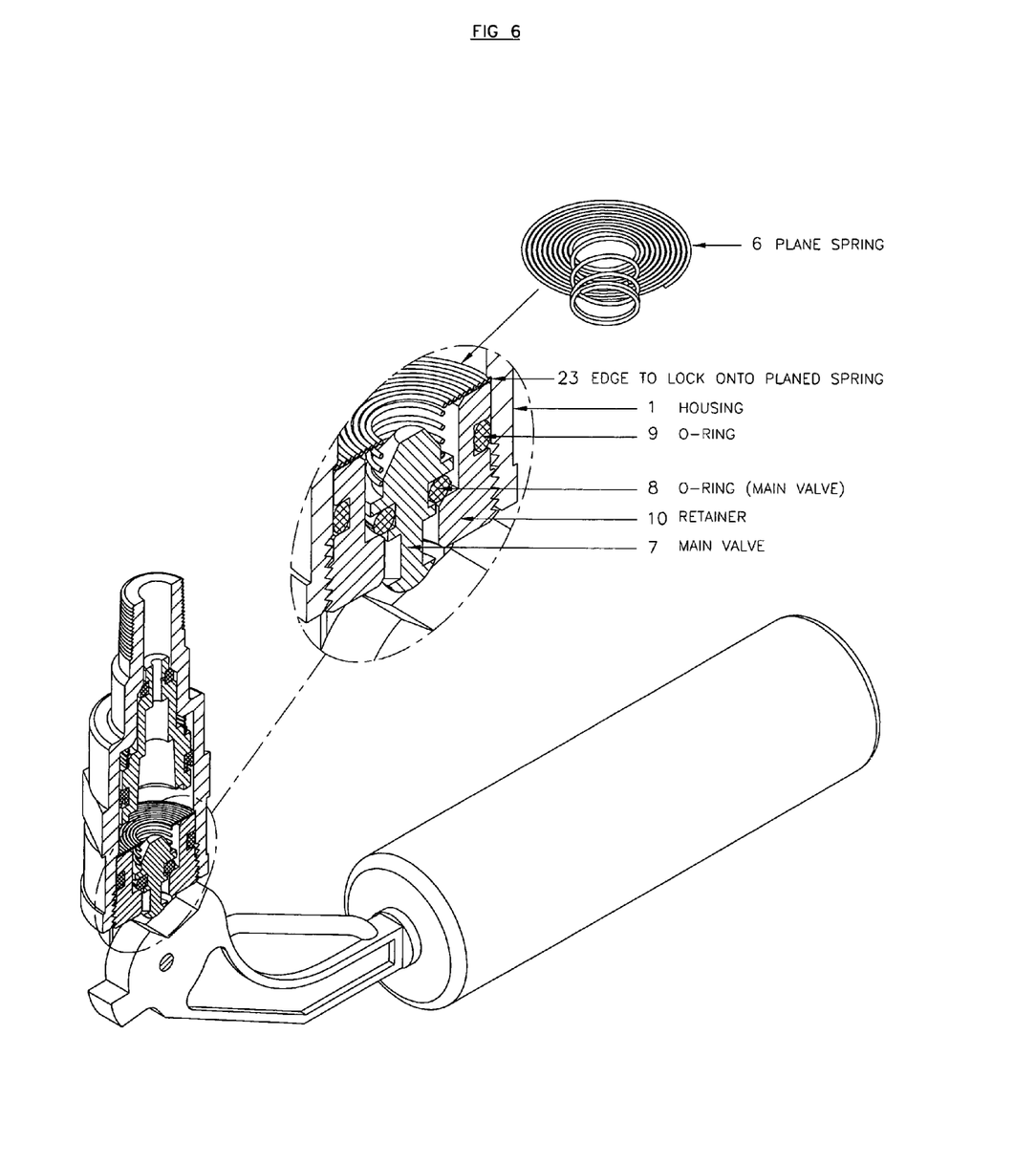
FIG. 6 shows the lower part of the invention that is connected to the level arm.
Figure 7:
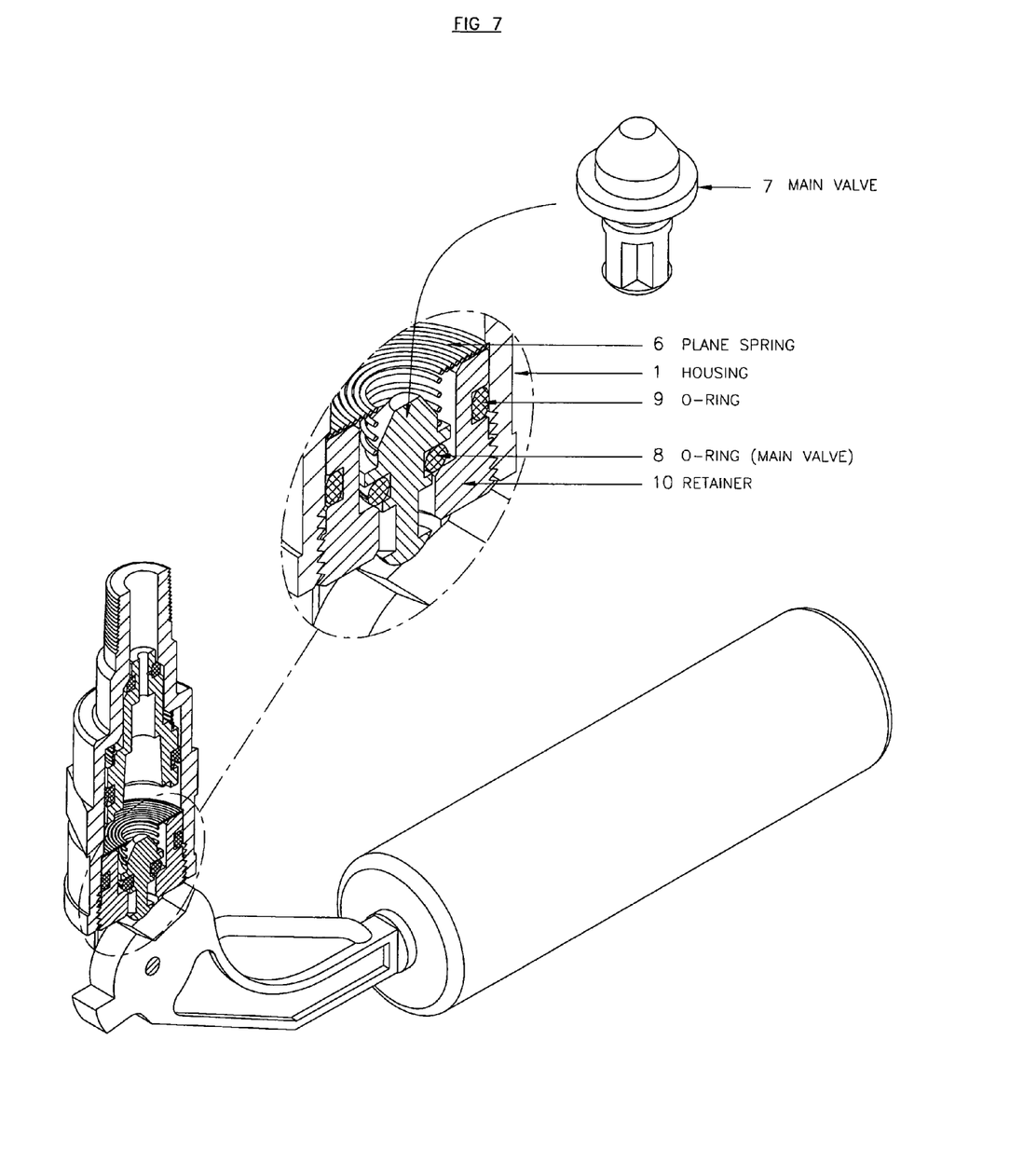
FIG. 7 shows the main valve of the invention.

The retainer (10) holds the main valve (7) and all the necessary internal accessories. The accessories include the plane spring (6) which has a flat plane circular and normal compressible spiral. This can be seen in FIG. 6. The housing (1) has a protruding edge (23) which will press onto the spring (6) after having been screwed onto the retainer (10). The housing (1) has a female thread (25) and the retainer (10) has the male thread (24). On the outer edge of the retainer (10) is a sealing o-ring groove (36) to hold the o-ring (9) This o-ring prevents the leakage after the housing (1) and the retainer (10) are screwed onto each other, and holds the leak inside the chamber. It will leak only when the main valve is actuated.

The main valve (7) consists of an o-ring (8) which will drop in the inner hole of the retainer and block off the gas flow in the middle through hole (26). At the bottom of the main valve, there is a pointed tip (27) which is rested upon a rising faced section (28) of the level arm (12). When the pointed tip (27) of the main valve (7) rises up from the middle hole because of the rising faced section (28), it makes the main valve rise up. This is as illustrated in FIG. 3.1 and FIG. 3.2 when the level arm is down. On the contrary, the U-shaped faced section (29) of the level arm will drop the pointed tip (27) onto the U-shape groove. This in turn will drop the main valve and shut off the gas flow. This happens when the level arm is upright as illustrated in FIG. 4.

The level arm consists of a rising faced section (28) and a U-shaped section (29) to function as the cam. The rising faced section (28) will raise the main valve and the U-shaped section (29) will drop the main valve to signify the opened and closed positions respectively. It also has a back rising section (30) to stop the level arm from swinging backward. The maximum position is the vertical position. Without the back rising section (30), the float (13) will dangle uncontrollably. In front of the cam (34), there is a front rising section (31) for the float to stop at the horizontal position as the maximum swing. This is as illustrated in FIG. 4. At the end of the level arm is the float (13) and the lock nut (14). The float (13) will rise up when we want the valve to shut at the 80 percent level. The lock nut (14) is used to lock the float from loosing out from the level arm.

The pin (11) is the pivoting position of the level arm. It acts as the focal point of the swing of the level arm (12).

The gas flows through the top hole (15) of the housing (1) and through the square hold (16) on the side. At the same time, it flows through the middle of the piston (5), through stepping chambers (20), (21) and (22) respectively. Below the piston (5) there rests a special spring (6) which is held up by the screwing of the housing (1) and the retainer (10). There is also a seal tight o-ring (9). The plane spring (6) with a compressible spring in the middle is pushed onto the main valve (7) to move down. However, due to the rising faced section (28) of the cam on the level arm (12), when the float (13) is down, it pushes the main valve (7) upward so that it will not seal. The gas then flows through the piston (5), the stepping chambers (20), (21) and (22), the spring (6), and the main valve (7) through the cross section (27) into the tank.

When the filling reaches the 80 percent level, the rising faced section (28) is rotated to the U-shaped section (29). Then, the main valve (7) drops to the U-shaped pocket and thus shuts off the gas flow in the middle.

Once the gas flow of the main valve is close to the middle through hole (26) of the retainer, the liquid flow creates the back pressure to lift the piston (5) up against the spring (2) until it shuts off the gas flow by the seal of the rubber packing (3) on the tip of the piston (5). The shut-off gas flow at its 80 percent level is enhanced.

BEST MODE OF INVENTION

As described in the Detailed Description of the Invention The invention claimed is:

1. An overfill protection device for a container, the overfill protection device comprising:
   a housing mounted at an opening to the container, the housing having at least a first hole and a second hole on a side thereof, the first and second holes being longitudinally positioned along a length of the housing;
   a movable piston within the housing, an interior of the piston having a plurality of stepped chambers, the first hole in the housing being adjacent an exterior of one of the stepped chambers and the second hole in the housing being adjacent an exterior of another of the stepped chambers;
   a main valve movable mounted beneath the piston;
   a retainer for holding the main valve adjacent the piston, the retainer being mounted to an end of the housing; and
   a pivotable lever arm having a cam, the cam of the lever arm having at least two faces, one of the faces moving the main valve to close a retainer opening in the retainer to thereby prevent flow through the retainer opening while pivoting of the lever arm to an open position engages another one of the faces of the cam with the main valve to thereby open the retainer opening and permit filling of the container, the stepped chambers of the piston being connected wherein at least one of gas and liquid can flow from the container opening through the piston to the retainer opening when the piston is in an open position, at least one of gas and liquid can also flow from the container opening outside of the piston and inside of the housing and pass through the first and second holes of the housing.

2. The overfill protection device as recited in claim 1, wherein the housing is opened and closed by the movable piston, initial filling of the container moving the piston to the open position,
   upon closing of the retainer opening by the main valve, pressure within the housing increases and thereby moves the piston to a closed position to stop filling of the container.

3. The overfill protection device as recited in claim 2, wherein the pivotable lever aim pivots to close the main valve when the container is 80 percent filled.

4. The overfill protection device as recited in claim 2, wherein gas within the container is purged through at least one of the retainer opening and at least one of the housing openings.

5. The overfill protection device as recited in claim 4, wherein the main valve has an o-ring for closing the retainer opening, the main valve being linearly reciprocal within the retainer, a first end of the main valve engages the two faces of the cam, a plane spring being provided to urge the main valve to close the retainer opening, the plane spring being located at a second end of the main valve, the first end of the main valve being opposite the second end thereof.

6. The overfill protection device as recited in claim 5, further comprising a backward spring surrounding a portion of the piston, the backward spring urging the piston to a position to open the openings of the housing, the backward spring and the plane spring being aligned, the plane spring being within the retainer and engaging a bottom of the piston.

7. The overfill protection device as recited in claim 6, wherein the plane spring has two portions, a first portion being a flat plane and a second portion being a compressible spiral, the first portion being positioned between the bottom of the piston and the retainer, the second portion of the plane spring presses on the main valve.

8. The overfill protection device as recited in claim 7, wherein a bottom of the piston has at least one slot, a fluid passage being provided between the interior stepped chambers of the piston and a space between the exterior of the piston and the housing via the at least one slot in the bottom of the piston, a seal being provided on the exterior of the piston to close the space, an increase in pressure within the interior of the piston also causing an increase in pressure in the space whereupon the piston is moved to close the openings of the housing.

9. The overfill protection device of claim 8, further comprising a semi-spherical seal at a top of the piston, the semi-spherical seal engaging the interior of the housing when the piston is moved to the closed position to thereby seal and close the housing openings.

10. The overfill protection device of claim 9, wherein the pivotal lever arm has a bent portion, a float being located on one end of the lever arm and the at least two faces being located at an opposite end of the lever arm, the float on the pivotal lever arm hanging downwardly into the container when filling of the container begins and the float moving to a horizontal position when the container is 80 percent filled.

11. The overfill protection device of claim 10, further comprising a ullage tube mounted to an outside of the housing, the pivotal lever arm has a middle riser extending over the ninety degree angle portion, the middle riser preventing the ullage tube from becoming stuck on the lever arm.

12. The overfill protection device of claim 2, wherein the main valve has an o-ring for closing the retainer opening, the main valve being linearly reciprocal within the retainer, a first end of the main valve engages the two faces of the cam, a plane spring being provided to urge the main valve to close the retainer opening, the plane spring being located at a second end of the main valve, the first end of the main valve being opposite the second end thereof.

13. The overfill protection device as recited in claim 12, further comprising a backward spring surrounding a portion of the piston, the backward spring urging the piston to a position to open the openings of the housing, the backward spring and the plane spring being aligned, the plane spring being within the retainer and engaging a bottom of the piston.

14. The overfill protection device as recited in claim 13, wherein the plane spring has two portions, a first portion being a flat plane and a second portion being a compressible spiral, the first portion being positioned between the bottom of the piston and the retainer, the second portion of the plane spring presses on the main valve.

15. The overfill protection device as recited in claim 1, wherein the housing has a plurality of openings in communication with the container, a bottom of the piston has at least one slot, a fluid passage being provided between an open interior of the piston and a space between the exterior of the piston and the housing via the at least one slot in the bottom of the piston, a seal being provided on the exterior of the piston to close the space, an increase in pressure within the interior of the piston also causing an increase in pressure in the space whereupon the piston is moved to close the openings of the housing.

16. The overfill protection device as recited in claim 15, further comprising a backward spring and a plane spring, the backward spring surrounding a portion of the piston, the backward spring urging the piston to a position to open the openings of the housing, the backward spring and the plane spring being aligned, the plane spring being within the retainer and engaging a bottom of the piston, the plane spring having two portions, a first portion being a flat plane and a second portion being a compressible spiral, the first portion being positioned between the bottom of the piston and the retainer, the second portion of the plane spring presses on the main valve to urge the main valve to close the retainer opening.

17. The overfill protection device of claim 1, wherein the pivotal lever arm has a bent portion, a float being located on one end of the lever arm and the at least two faces being located at an opposite end of the lever arm, the float on the pivotal lever arm hanging downwardly into the container when filling of the container begins and the float moving to a horizontal position when the container is 80 percent filled.

18. The overfill protection device of claim 17, further comprising a ullage tube mounted to an outside of the housing, the pivotal lever arm has a middle riser extending over the ninety degree angle portion, the middle riser preventing the ullage tube from becoming stuck on the lever arm.

* * * * *